(12) United States Patent
Kwon et al.

(10) Patent No.: US 7,717,380 B2
(45) Date of Patent: May 18, 2010

(54) AUTOMATIC HEIGHT ADJUSTMENT LEG OF LAUNDRY HANDLING APPARATUS AND LAUNDRY HANDLING APPARATUS

(75) Inventors: Ho Cheol Kwon, Chanwon-si (KR); Beom Jun Kim, Kimhae-si (KR); Il Hyeok Yim, Koyang-si (KR); Hack Chai Song, Chanwon-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/494,761

(22) Filed: Jul. 28, 2006

(65) Prior Publication Data

US 2007/0023591 A1  Feb. 1, 2007

(30) Foreign Application Priority Data

| Jul. 30, 2005 | (KR) | 10-2005-0069989 |
| Jul. 30, 2005 | (KR) | 10-2005-0069990 |
| Jul. 30, 2005 | (KR) | 20-2005-0022204 U |
| Jul. 30, 2005 | (KR) | 20-2005-0022205 U |

(51) Int. Cl.
*F16M 11/24* (2006.01)

(52) U.S. Cl. ............... 248/188.3; 16/44; 248/188.8

(58) Field of Classification Search ........... 248/188.3, 248/188.2, 188.4, 188.5, 676, 188.8, 638, 248/649; 312/228; 188/322.15, 322.22; 16/32, 33, 34; 210/365
See application file for complete search history.

(56) References Cited

U.S. PATENT DOCUMENTS

| 2,243,565 | A | * | 5/1941 | Kimball et al. ............. 210/365 |
| 2,852,883 | A | * | 9/1958 | Walsh ....................... 248/188.9 |
| 3,191,895 | A | | 6/1965 | Whelan |
| 4,474,271 | A | * | 10/1984 | Molders et al. ............. 188/280 |
| 5,156,451 | A | * | 10/1992 | Pollock ..................... 312/351.3 |
| 5,738,190 | A | * | 4/1998 | Deferme ..................... 188/280 |
| 6,161,662 | A | * | 12/2000 | Johnston et al. .......... 188/282.3 |
| 6,328,291 | B1 | * | 12/2001 | Marzocchi et al. ........ 267/64.15 |
| 6,352,144 | B1 | * | 3/2002 | Brooks ..................... 188/267.2 |
| 6,394,239 | B1 | * | 5/2002 | Carlson .................... 188/267.2 |
| 7,134,534 | B2 | * | 11/2006 | Chen ...................... 188/322.13 |
| 7,201,260 | B2 | * | 4/2007 | Diederich et al. ....... 188/322.15 |
| 2005/0109571 | A1 | * | 5/2005 | Burkert et al. ......... 188/322.15 |
| 2007/0205342 | A1 | * | 9/2007 | Gabriel ..................... 248/188.4 |

FOREIGN PATENT DOCUMENTS

| DE | 3217624 | * | 1/1983 |
| WO | WO 2006/080705 | | 8/2006 |

OTHER PUBLICATIONS

German Office Action dated Apr. 21, 2009.

\* cited by examiner

*Primary Examiner*—Ramon O Ramirez
(74) *Attorney, Agent, or Firm*—KED & Associates, LLP

(57) ABSTRACT

An automatic height adjustment leg of a laundry handling apparatus according to the present invention comprises a cylinder mounted to a base of a laundry handling apparatus; a piston movably arranged inside the cylinder; a elastic member installed in the cylinder so as to elastically support the piston; and a leg penetrating the cylinder and fixed to the piston. There are provided advantages that the horizontality of the laundry handling apparatus may be automatically adjusted as the piston and leg move on and vibration may be absorbed and reduced by the elastic member.

14 Claims, 15 Drawing Sheets

AUTOMATIC HEIGHT ADJUSTMENT LEG OF LAUNDRY HANDLING APPARATUS AND LAUNDRY HANDLING APPARATUS

This Nonprovisional application claims priority under 35 U.S.C. § 119(a) on Patent Application No. 10-2005-0069989 filed in Korea on Jul. 30, 2005, Patent Application No. 10-2005-0069990 filed in Korea on Jul. 30, 2005, Utility Model Application No. 20-2005-0022204 filed in Korea on Jul. 30, 2005 and Utility Model Application No. 20-2005-0022205 filed in Korea on Jul. 30, 2005, the entire contents of which are hereby incorporated by reference.

BACKGROUND OF THE INVENTION

1. Field of the Invention

The present invention relates to an automatic height adjustment leg of a laundry handling apparatus capable of supporting the laundry handling apparatus and adjusting the height of the laundry handling apparatus, and the laundry handling apparatus, and more particularly to an automatic height adjustment leg of a laundry handling apparatus whose height is automatically adjusted and absorbs vibration, and the laundry handling apparatus.

2. Description of the Conventional Art

In general, a laundry handling apparatus is an apparatus to wash or dehydrate laundry contained in a drum by rotating the drum, and this may be classified depending on its function as follows: a washing machine of decontaminating dirt on clothes or bedding (hereinafter, referred to as 'laundry') by mechanical interaction together with water and detergent, a dryer of drying wet laundry from mechanical interaction and heated dry wind, and a washing machine with dryer having both of washing function and drying function.

FIG. 1 is a prospective view, whose part is cut, of illustrating an example of a general laundry handling apparatus.

In a general laundry handling apparatus, as shown in FIG. 1, a tub (not shown) for receiving washing water is shock-absorbably installed in a cabinet 2, and a drum 4 for receiving laundry is rotatably arranged in the tub.

A cabinet cover 8 formed with a laundry doorway 6 for putting laundry in or pull it out of the drum 4 is mounted on the front surface of the cabinet 2, and a door 10 for opening and closing the laundry doorway 6 is pivotably installed on the cabinet cover 8.

And, a top plate 12 and a base 14 are mounted on a top surface and a bottom surface of the cabinet 2, respectively, and a height adjustment leg 20 is installed on four edges of the base 14 so as to support the drum type washing machine 1 and adjusting the height of the drum type washing machine 1.

The height adjustment leg 20 consists of a bolt part 22 screw-connected to the base 14 and a supporting part 24 fixed to the bottom part of the bolt part 22 and attached to the floor surface where the drum type washing machine 1 is to be installed, and a height adjustment part 26 in the hexagonal shape is integrally formed with either of the bolt part 22 and supporting part 24.

On the other hand, the laundry handling apparatus 1 according to the prior art adjusts its height by combining a tool such as a spanner to the height adjustment part 26 and then rotating it in the clockwise or counterclockwise direction.

If the height adjustment part 26 is rotated, then the bolt part 22 and supporting part 24 are rotated together, and thus the bolt part 22 is inserted into the base 14 or removed from the base 14.

Accordingly, as the height of the height adjustment leg 20 installed on the base 14 becomes higher or lower, the height of the laundry handling apparatus 1 is adjusted.

However, the height of the height adjustment leg of the laundry handling apparatus 1 according to the prior art has been manually adjusted by user, and this gives rise to the lowering of workability for adjusting the height of the laundry handling apparatus 1.

Furthermore, the horizontality of the laundry handling apparatus 1 is accomplished by adjusting the height of each of four height adjustment legs 20 installed on the base 14 while the laundry handling apparatus 1 is installed, and thus this makes it inconvenient to accomplish the horizontality of the laundry handling apparatus 1 and increases the install time for the laundry handling apparatus 1.

SUMMARY OF THE INVENTION

The present invention is designed to solve the above problems of the prior art, and it is an aspect of the present invention to provide an automatic height adjustment leg of a laundry handling apparatus capable of automatically adjusting the horizontality of the laundry handling apparatus and the laundry handling apparatus.

It is another aspect of the present invention to provide an automatic height adjustment leg of a laundry handling apparatus capable of preventing mal-operation of the automatic height adjustment leg by prohibiting a user who is not accustomed to the service of the automatic height adjustment leg to readily dissemble the automatic height adjustment leg.

It is still another aspect of the present invention to provide an automatic height adjustment leg of a laundry handling apparatus whose parts are not readily released.

An automatic height adjustment leg of a laundry handling apparatus according to the present invention configured as above includes a cylinder mounted to a base of a laundry handling apparatus; a piston movably arranged inside the cylinder; a elastic member installed in the cylinder so as to elastically support the piston; and a leg penetrating the cylinder and fixed to the piston.

The automatic height adjustment leg further includes a frictional member mounted to the piston so as to frictionally contact the cylinder.

The cylinder includes a cylinder body whose top surface is open; and a cylinder cap connected to the cylinder body to cover the top surface of the cylinder body and supporting the elastic member.

The cylinder body and cylinder cap are screw-connected.

The cylinder cap protrudingly formed with a first protrusion, and the cylinder body protrudingly formed with a second protrusion, the first protrusion locked and fixed to the second protrusion.

The first protrusion and the second protrusion are formed in a horizontal sawtooth shape in which a plurality of protrusions are arranged constantly in a connection direction of the cylinder cap and cylinder body, or the first protrusion is formed in a right-angled triangle having an inclined surface in a connection direction, and the second protrusion is formed in a right-angled triangle having an inclined surface opposite to the inclined surface of the first protrusion.

The cylinder is protrudingly formed with a penetrating part passing through the base.

The automatic height adjustment leg further includes a connection member connected to the penetrating part so as to mount the cylinder to the base; and a releasing restriction device restricting releasing of the connection member.

The releasing restriction device includes a covering part surrounding an outside of the connection member, and a locking part extended and formed to an upper side of the covering part and locked to a top surface of the connection member.

A prominent and depressed portion is formed on an outer peripheral surface of the covering part.

A male screw is formed on an outer peripheral surface of the penetrating part, and the connection member has a female screw connected to the male screw.

The locking part includes a locking projection protruded from an upper part of the penetrating part so as to be locked downward to a verge of a top surface of the nut.

The locking projection is formed with a groove so that an edge part of the nut may pass therethrough.

The locking projection is formed along the circumference of a top end of the covering part, and the groove is formed in plurality on the locking projection so as to correspond to an edge part of the nut.

The releasing restriction device includes a covering part surrounding an outside of the connection member, and a hooking part extended and formed to the covering part and hooked to a hooking hole formed on the base.

A prominent and depressed portion is formed on an inner peripheral surface of the covering part so that the connection member may be inserted in an upper and lower direction and locked in a circumference direction.

The base includes a base pan forming an appearance of a bottom surface of the laundry handling apparatus, and a base bracket mounted to the base pan and mounting the cylinder.

A laundry handling apparatus according to the present invention includes a base forming a bottom surface of the laundry handling apparatus; manual height adjustment legs installed on at least any one of four edges of the base; and automatic height adjustment legs installed on the other edges of the four edges of the base where the manual height adjustment legs are not installed.

In the automatic height adjustment leg of the laundry handling apparatus according to the present invention configured as above, since the piston connected to the leg is arranged to be elastically moved in the cylinder, there is provided an advantage that the horizontality of the laundry handling apparatus is automatically adjusted as the piston and leg moves on, and vibration is absorbed or reduced by the elastic member.

In the automatic height adjustment leg of the laundry handling apparatus according to the present invention, in addition, since the first protrusion of the cylinder cap is locked and fixed to the second protrusion of the cylinder body, there is provided another advantage that free releasing of the cylinder cap may be prevented by the locking force of the first protrusion and second protrusion.

In the automatic height adjustment leg of the laundry handling apparatus according to the present invention, in addition, since the releasing restriction device is arranged around the connection member of fixing the cylinder to the base and thereby the connection member is not freely adjusted and released by customer or unskilled repairer, there is provided yet still another advantage that damage to the automatic height adjustment leg or over-vibration of the laundry handling apparatus may be prevented.

DETAILED DESCRIPTION OF THE PREFERRED EMBODIMENT

Hereinafter, embodiments of an automatic height adjustment leg of a laundry handling apparatus and the laundry handling apparatus according to the present invention will be described below with reference to the appending drawings.

Figure 1:
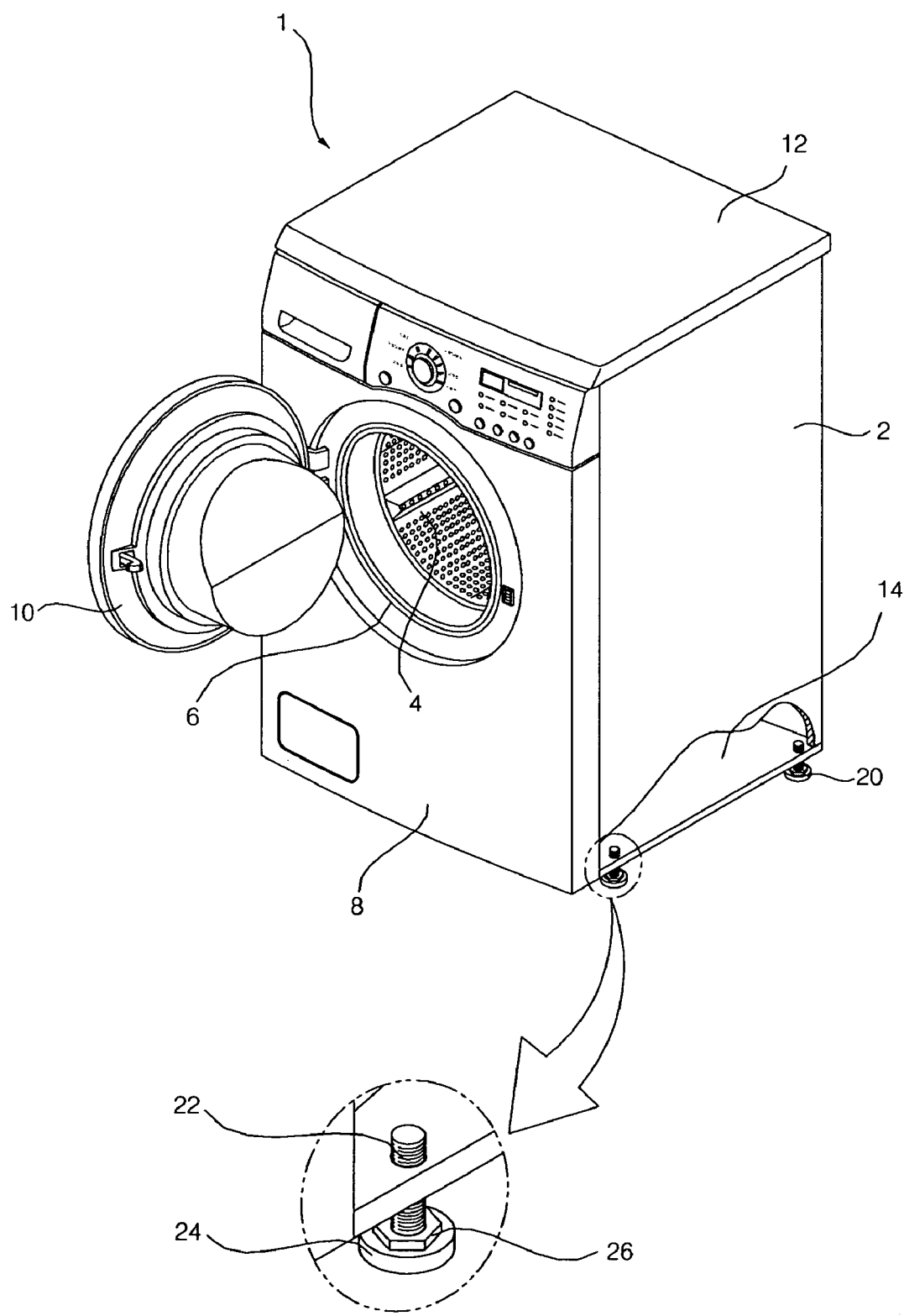
FIG. 1 is a prospective view, whose part is cut, of illustrating an example of a general laundry handling apparatus.
Figure 2:
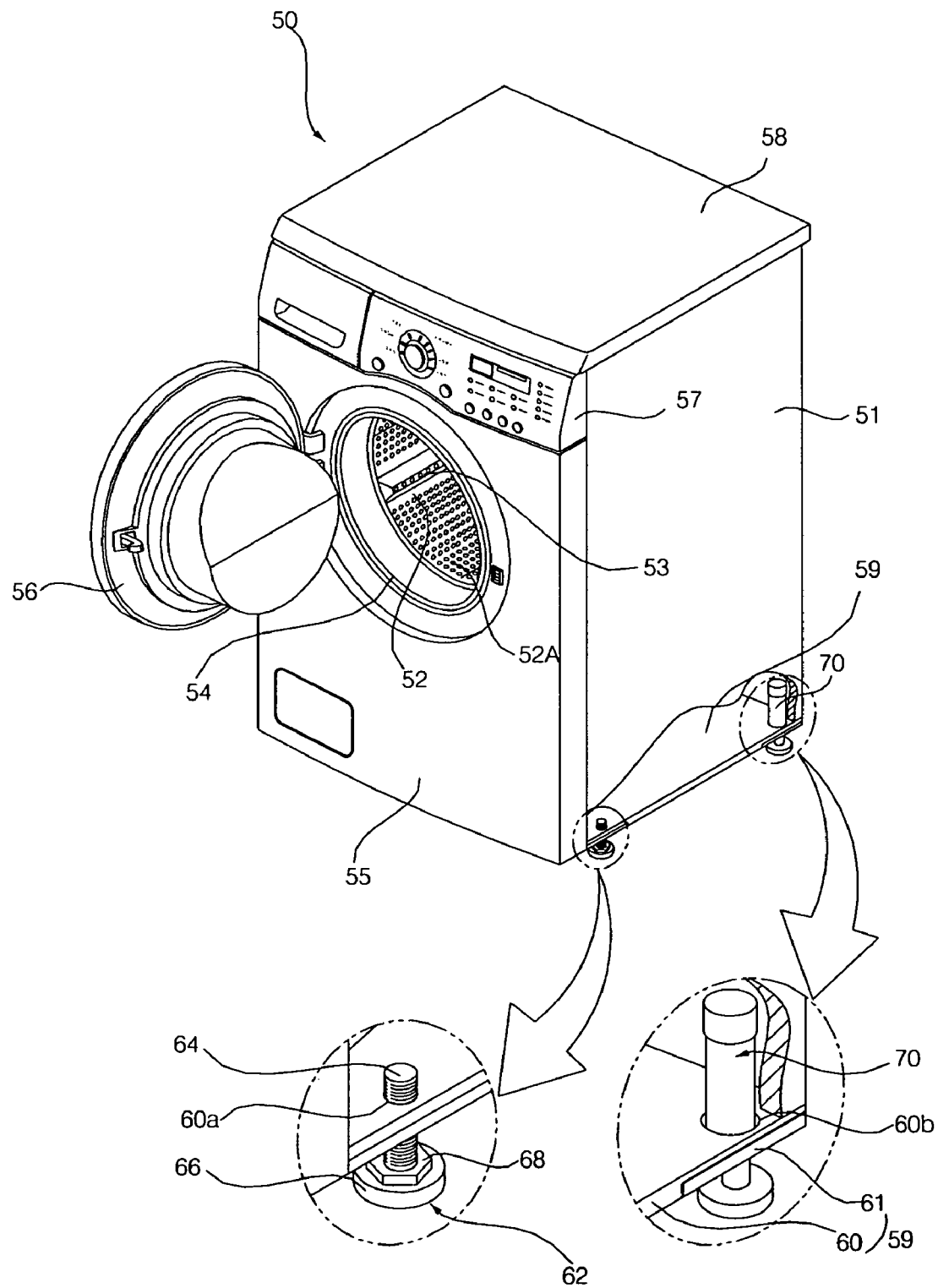
FIG. 2 is a prospective view, whose part is cut, of illustrating a laundry handling apparatus applied with a first embodiment of an automatic height adjustment leg of a laundry handling apparatus according to the present invention

FIG. 2 is a prospective view, whose part is cut, of illustrating a laundry handling apparatus applied with a first embodiment of an automatic height adjustment leg of a laundry handling apparatus according to the present invention The laundry handling apparatus shown in FIG. 2 includes a cabinet 51, a tub (not shown) installed inside the cabinet 51, a drum 52 rotatably arranged inside the tub and having a plurality of water holes 52A, a plurality of lifters 53 installed in the inner surface of the drum 52 and lifting laundry so that the laundry may fall by gravity while the drum 52 rotates, and a motor (not shown) mounted behind the tub and rotating the drum 52.

A spring is connected to the cabinet 51 so as to suspend the tub.

A cabinet cover 55 having a laundry doorway 54 formed on its middle part is mounted on the front surface of the cabinet 51.

A door 56 for opening and closing the laundry handling apparatus 54 is pivotably installed on the cabinet cover 55.

A control panel 57 is installed on the upper side of the cabinet cover 55 so as to display the operational state of the laundry handling apparatus 50 and manipulate the operation of the laundry handling apparatus 50.

A top plate 58 is mounted on the top surface of the cabinet 51.

The cabinet 51 is placed and mounted on a base 59 forming the appearance of the bottom part of the laundry handling apparatus.

A damper is connected to the base 59 so as to shock-absorbably support the tub.

A plurality of height adjustment legs 62, 70 are installed on the base 59 so as to support the load of the laundry handling apparatus 50 and adjust the height of the drum type washing machine 50.

On the other hand, the plurality of height adjustment legs consist of manual height adjustment legs 62 installed on at least two and more of four edges of the base 59 and automatic height adjustment legs 70 installed on the other edges of the four edges of the base 59 where the manual height adjustment legs are not installed.

The manual height adjustment leg 62 includes a bolt part 64 screw-connected to the base 59 and a supporting part 66 fixed to the bottom part of the bolt part 64 and placed and attached on the floor surface where the laundry handling apparatus 50 is to be installed.

In the manual height adjustment leg 62, a height adjustment part 68 in the hexagonal nut shape is integrally formed with either of the bolt part 64 and supporting part 66 so as to be capable of manually adjusting its height by a tool such as a spanner.

The automatic height adjustment leg 70 is configured so that its height may be automatically adjusted according to the height of the manual height adjustment leg 62 and thereby the laundry handling apparatus 50 may be horizontally installed as a whole.

In this laundry handling apparatus, the base 59 may be a member and the manual height adjustment legs 62 and automatic height adjustment legs 70 may be mounted directly on edges of the base 59, or the base 59 may consist of a base pan 60 forming the appearance of the bottom part of the laundry handling apparatus and a base bracket 61 mounted on the base pan 60 and the manual height adjustment legs 62 and automatic height adjustment legs 70 may be installed on the base bracket 61. Hereinafter, a case where the manual height adjustment legs 62 and automatic height adjustment legs 70 are installed on the base bracket 61 will be described.

The base bracket 61 is made of a metal material so as to be capable of firmly installing the manual height adjustment legs 62 and automatic height adjustment legs 70, and this is installed to the base pan 60 with a connection member such as a screw.

The reference numeral 60a refers to a penetrating hole formed in the base pan 60 so that the bolt part 64 of the manual height adjustment leg 62 may pass therethrough, and the reference numeral 60b refers to a penetrating hole formed in the base pan 60 so that the automatic height adjustment leg 70 may pass therethrough.

Figure 3:
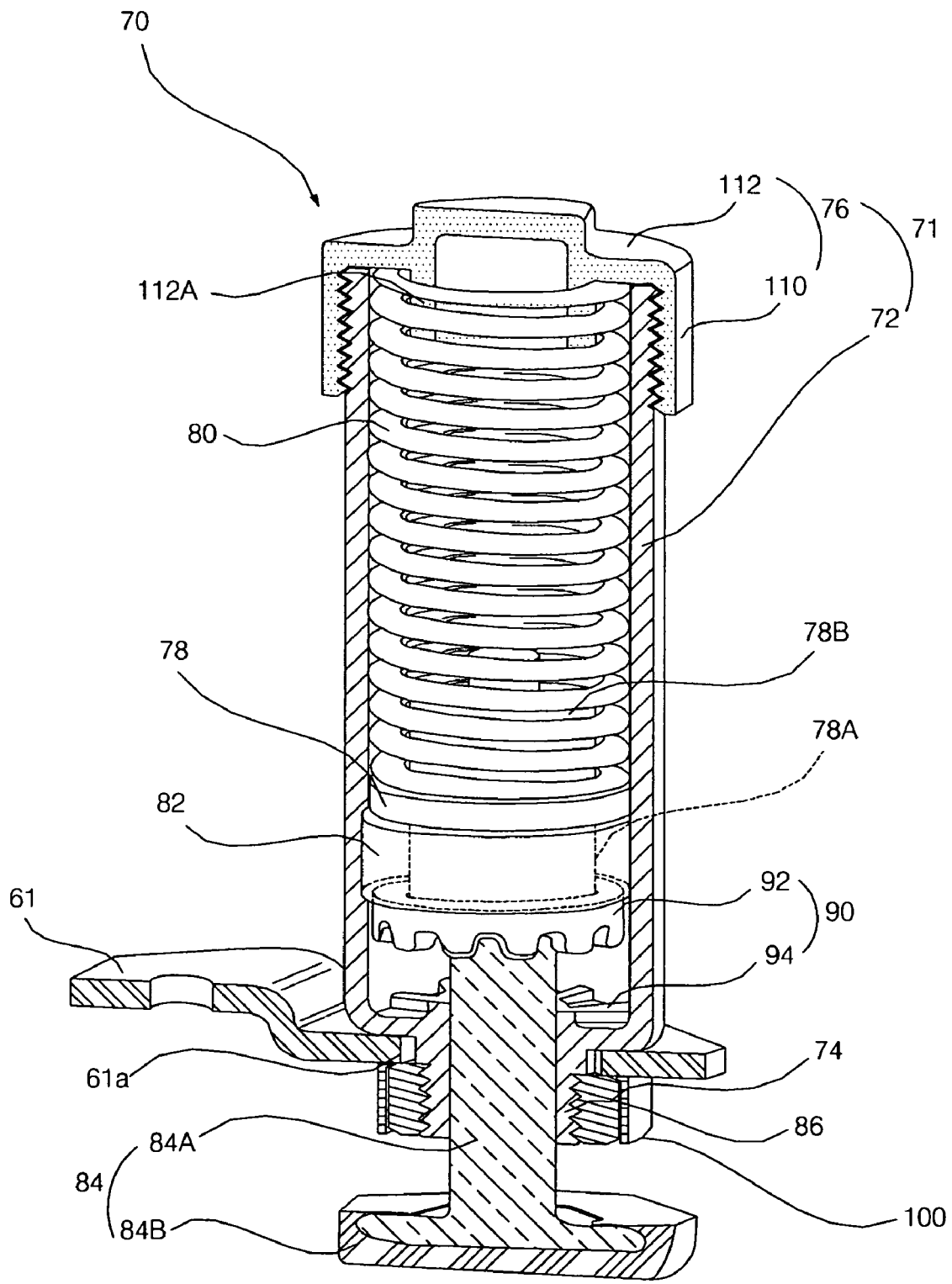
FIG. 3 is a sectional view of illustrating a first embodiment of an automatic height adjustment leg of a laundry handling apparatus according to the present invention.

FIG. 3 is a sectional view of illustrating a first embodiment of an automatic height adjustment leg of a laundry handling apparatus according to the present invention.

The automatic height adjustment leg 70, as shown in FIG. 3, includes a cylinder 71 mounted to the base, particularly to the base bracket 61, a piston movably arranged inside the cylinder 71, an elastic member 80 elastically supporting the piston 78, a frictional member 82 mounted to the piston 78 so as to frictionally contact the cylinder 71 and a leg 84 connected to the piston 78.

The automatic height adjustment leg 70 adjusts its horizontality by expanding or contracting the elastic member 80 in case that a portion of the bottom part of the laundry handling apparatus, where the automatic height adjustment leg 70 is mounted, is not horizontal with the other portion, for example, a portion where the manual height adjustment leg 62 is mounted.

In the automatic height adjustment leg 70, when the laundry handling apparatus, particularly the base 59, vibrates, the elastic member 80 absorbs the vibration and the frictional member 82 attenuates the vibration through the friction with the cylinder 71.

Hereinafter, the detailed construction of the automatic height adjustment leg 70 will be described.

The cylinder 71 consists of a cylinder body 72 whose top surface is open and a cylinder cap 76 connected to the cylinder body 72 so as to cover the top surface of the cylinder body 72 and supported by the elastic member 80.

The cylinder body 72 is an injection product in the cylinder shape which is long provided in the upper and lower direction and has a cavity in its center, and its top surface is open so that the piston 78 and elastic member 80 may be inserted therein.

The cylinder body 72 has a penetrating part 86 which passes through the penetrating hole 61a formed in the base bracket 61.

The penetrating part 86 in the cylinder body 72 is formed in a cylindrical cavity shape so that the upper part of the leg 84 may pass therethrough.

The penetrating part 86 in the cylinder body 72 is protruded from the bottom end of the cylinder body 72 so that its upper side may be placed vertically to the base bracket 61.

The outer peripheral surface of the penetrating part 86 in the cylinder body 72 is threaded so that the connection member 74 may be screw-connected therewith.

The connection member 74 is a nut which has a female screw connected to the male screw of the penetrating part 86 and is screw-connected to the outer peripheral surface of the penetrating part 86, and the following description will be restricted to the nut.

In the automatic height adjustment leg 70, if the nut 74 is connected to the penetrating part 86 passing through the base bracket 61, the cylinder body 72 is assembled to the nut 74 with the base bracket 61 sandwiched between the cylinder body 72 and the nut 74, and the cylinder body 72 is firmly fixed to the base bracket 68.

On the other hand, if the nut 74 is manipulated by customer or unskilled repairer without any restriction, the automatic height adjustment leg 70, particularly the cylinder body 72 is moved freely by vibration and impact of the laundry handling apparatus 50 and thus the automatic height adjustment leg 70 may be damaged or the laundry handling apparatus 50 may fall down. Therefore, the automatic height adjustment leg 70 may further include a releasing restriction device 100 which serves to prohibit customer or unskilled repairer to release the nut freely.

The releasing restriction device 100 will be described later in more detail.

The cylinder cap 76 is an injection product in the cylindrical shape whose bottom surface is open in order to be capable of covering the top end of the cylinder body 72, and this consists of a connection part 110 connected to the outer peripheral surface of the top end of the cylinder body 72 with a screw connection structure and a supporting part 112 of supporting the top end of the elastic member 80.

The connection part 110 is threaded in its inner peripheral surface so as to be screw-connected to the male screw formed on the outer peripheral surface of the top end of the cylinder body 72.

An upper side insertion part 112A is protruded downward on the bottom surface of the supporting part 112 so as to stably support the top end of the elastic member 80.

The piston 78 is an injection product in the cylindrical shape which rises and falls in the upper and lower direction along the inside of the cylinder body 72, and this is provided with a mounting groove 78A formed along the surrounding of the outer peripheral surface so as to mount and fix the frictional member 82 and a connection groove (not shown) formed with a female screw in the center of its bottom surface so as to fix the top end of the leg 84 with the screw connection structure.

A lower side insertion part 78B is protruded at a constant height in the top surface of the piston 78, which is inserted into the inside of the coil spring 80 having a cavity in its center so as to stably support the bottom end of the coil spring 80.

The elastic member 80 is a coil spring 80 which elastically supports the piston 78; its bottom end is arranged on the top surface of the piston 78 and its top end is arranged on the bottom surface of the supporting part 112 of the cylinder cap 76.

The frictional member 82 is a member which prevents the sudden relative movement of the cylinder, especially the cylinder body 72 and piston 78 and attenuates the vibration transferred to the automatic height adjustment leg 70, and this is mounted to the mounting groove 78A of the piston 78 and formed in a cylindrical shape so as to increase the contacting area with the cylinder body 72.

It is desirable that the frictional member 82 is made of either of felt or sponge.

The leg 84 consists of a bolt part 84A penetratingly inserted into the penetrating part 86, whose top end is connected to the connection groove of the piston 78, and a supporting part 84B fixed to the bottom end of the bolt part 84A and attached to the floor surface where the laundry handling apparatus 50 is to be installed.

The outer peripheral surface of the top end in the bolt part 84A is formed with a male screw so as to be connected to the connection groove of the piston 78 with a screw connection structure, and the outer peripheral surface of the part other than the top end is not formed with a male screw so as to be arranged movably in the upper and lower direction to the penetrating part 86.

A rotation preventing part 90 is formed on at least one of the piston 78 and cylinder body 72 in the automatic height adjustment leg 70 so that the piston 78 does not rotate together with the bolt part 84A when the bolt part 84A of the leg 84 is connected to the connection groove of the piston 78.

The rotation preventing part 90 consists of a first locking protrusion 92 protruded downward from the bottom surface of the piston 78 and a second locking protrusion 94 protruded upward from the bottom surface inside the cylinder body 72, particularly the cylinder body 72 so that the first locking protrusion 92 may be locked in a circumference direction.

The first locking protrusion 92 is formed in plurality in a circumference direction with respect to the connection groove on the bottom surface of the piston 78, and the second locking protrusion 94 is radially formed to correspond to the first locking protrusion 92 with respect to the protruding part 86 on the bottom surface inside the cylinder body 72.

As the first locking protrusion 92 of the piston 78 is locked to the second locking protrusion 94 of the cylinder body 72, the piston 78 does not rotate together with the bolt part 84A when the bolt part 84A of the leg 84 is connected to the connection groove of the piston 78, and therefore the leg 84 and piston 78 may be readily assembled.

As the load of the laundry handling apparatus 50 is not transferred to the automatic height adjustment leg 70, the piston 78 is closely attached to the bottom surface of the cylinder body 72 by the elastic member 80 and the first locking protrusion 92 and second locking protrusion 94 become locked state.

Figure 4:
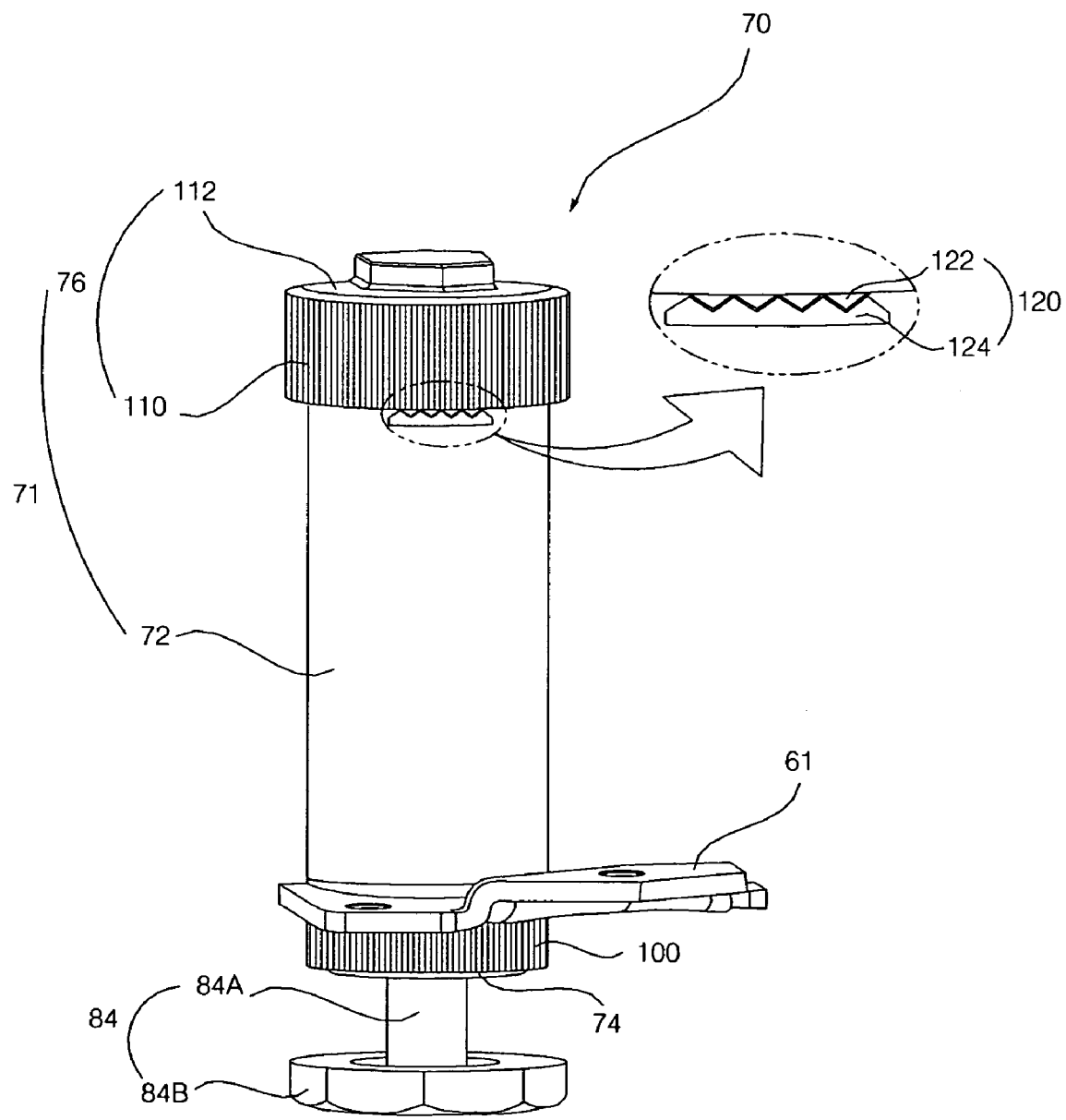
FIG. 4 is a prospective view of illustrating a first embodiment of an automatic height adjustment leg of a laundry handling apparatus according to the present invention.
Figure 5:
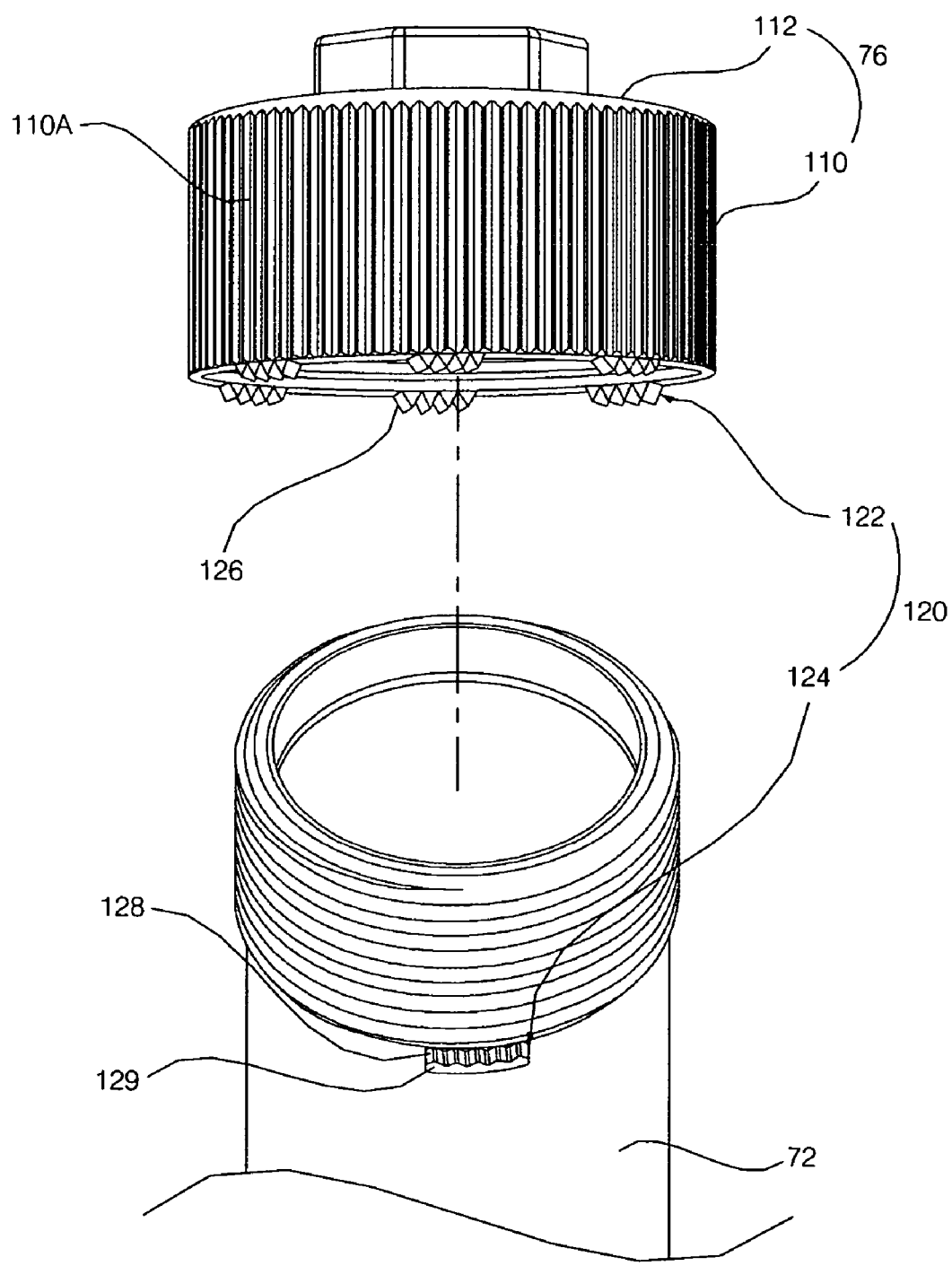
FIG. 5 is an exploded prospective view of illustrating a cylinder body and a cylinder cap shown in FIG. 4.

FIG. 4 is a prospective view of illustrating a first embodiment of an automatic height adjustment leg of a laundry handling apparatus according to the present invention, and FIG. 5 is an exploded prospective view of illustrating a cylinder body and a cylinder cap shown in FIG. 4.

The outer peripheral surface of the connection part 110 in the cylinder cap 76 is formed with a plurality of prominent and depressed portions 110A for readily rotating and connecting the cylinder cap 76.

The cylinder cap 76 and cylinder body 72 in the automatic height adjustment leg 70 are formed with a locking protrusion 120 so as to prevent the cylinder cap 76 from being freely released from the cylinder body 72.

The locking protrusion 120 consists of a first protrusion 122 protruded downward from the bottom end of the connection part 110 of the cylinder cap 76 and a second protrusion 124 protruded from the outer peripherals of the top end of the cylinder body 72 so that the first protrusion 122 may be locked and fixed when the mounting of the cylinder cap 76 is complete.

The first protrusion 122 is protruded downward from the bottom surface of the connection part 110 of the cylinder cap 76; this is formed in a horizontal sawtooth-shaped structure in which a plurality of protrusions 126 are formed constantly and horizontally along the bottom end of the connection part 110.

The second protrusion 124 is formed on the top surface of a stopper 129 protruded outward from the outer peripheral surface of the upper side of the cylinder body 72; this is formed in a horizontal sawtooth-shaped structure in which a plurality of protrusions 128 are formed constantly and horizontally along the top surface of the stopper 129.

The protrusions 126, 128 of the first protrusion 122 and second protrusion 124 are a triangular protrusion having triangular section, and they are all locked when the connection of the cylinder cap 76 is complete.

Free releasing of the cylinder cap 76 is prevented by the locking force of the first protrusion 122 and second protrusion 124, and over-connection of the cylinder cap 76 is prevented as the first protrusion 122 is locked to the top surface of the second protrusion 124.

At least one of the first protrusion 122 and second protrusion 124 is spaced and formed in plurality in the circumference direction.

The first protrusion 122 may be formed plurally in the circumference direction on the bottom end of the connection part 110 of the cylinder cap 76, or the second protrusion 124 may be formed plurally in the circumference direction of the outer peripheral surface of the upper side of the cylinder body 72.

Figure 6:
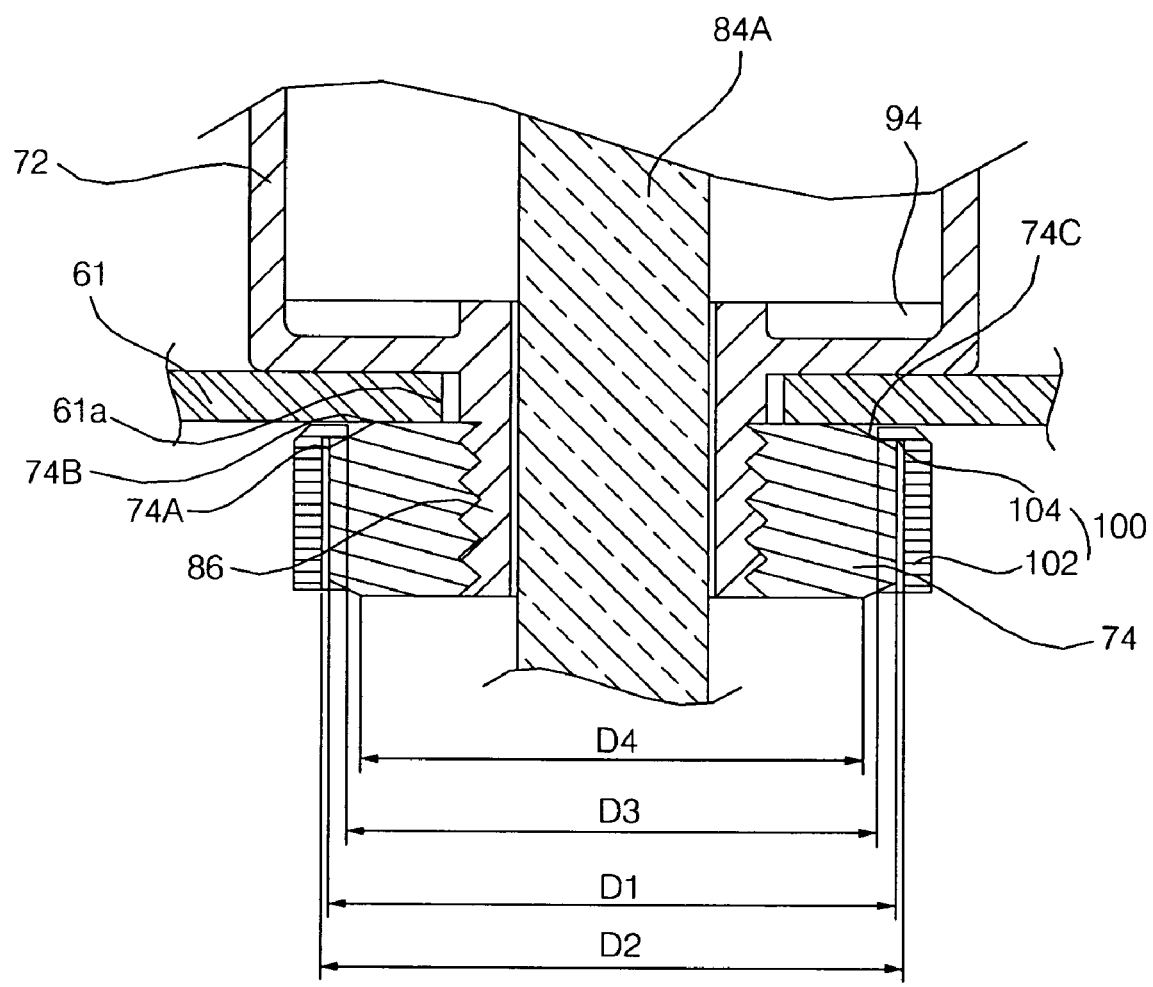
FIG. 6 is an enlarged sectional view of illustrating a nut and a releasing restriction device shown in FIG. 3.
Figure 7:
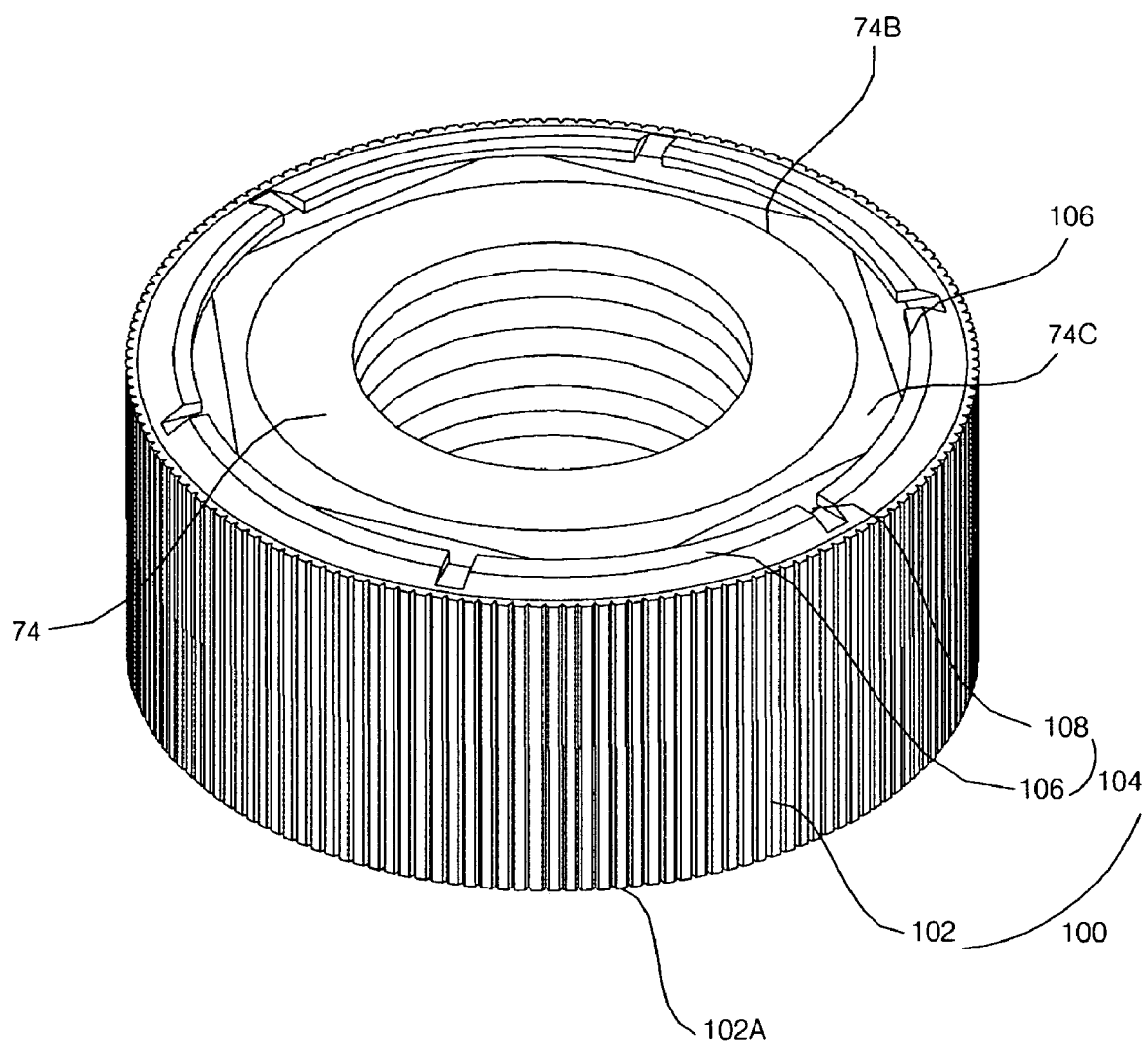
FIG. 7 is a bottom surface view of illustrating a first embodiment of an automatic height adjustment leg of a laundry handling apparatus according to the present invention.
Figure 8:
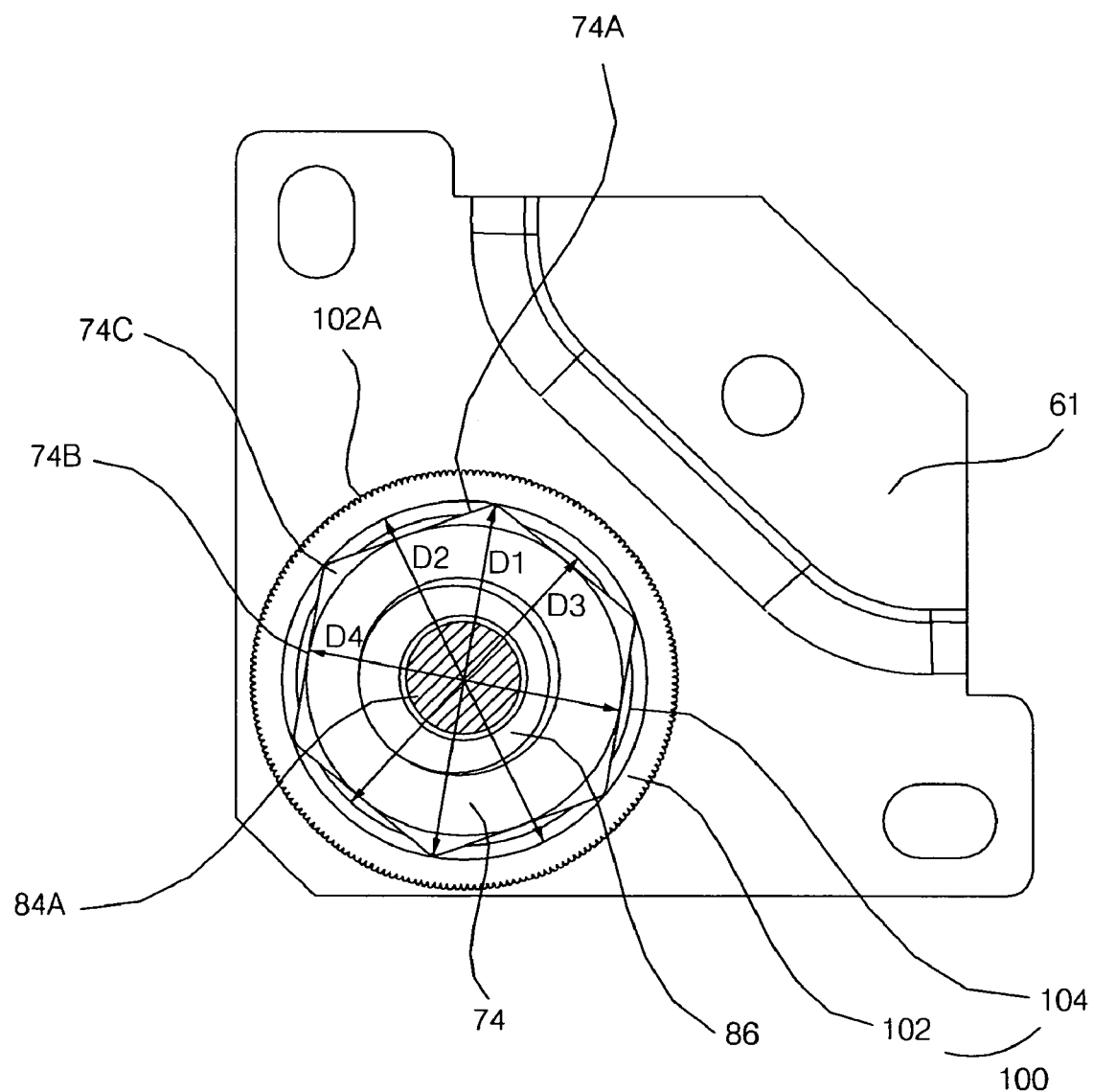
FIG. 8 is an enlarged prospective view of illustrating a nut and a releasing restriction device shown in FIG. 3.

FIG. 6 is an enlarged sectional view of illustrating a nut and a releasing restriction device shown in FIG. 3, FIG. 7 is a bottom surface view of illustrating a first embodiment of an automatic height adjustment leg of a laundry handling apparatus according to the present invention, and FIG. 8 is an enlarged prospective view of illustrating a nut and a releasing restriction device shown in FIG. 3.

The releasing restriction device 100 is a injection product formed in a tube shape, and this consists of a covering part 102 of surrounding the outside of the nut 74 connected to the penetrating part 86 and a locking part 104 formed on the top end of the covering part 102 and locked to the verge of the top surface of the nut 74, as shown in FIG. 6.

The covering part 102 has an inner diameter D2 slightly greater than the maximum outer diameter D1 of the nut 74.

The outer peripheral surface of the covering part 102 in the releasing restriction device 100, as shown in FIG. 7, is formed with a plurality of prominent and depressed portions 102A so as to facilitate attaching and detaching work.

The locking part 104, as shown in FIG. 7, consists of a locking projection 106 protrudingly formed inward on the top side of the covering part 102 so that the covering part 102 does not slide down and a plurality of grooves 108 in the partially-eliminated shape so that the nut 74 may pass through the locking projection 106 and be placed inside the covering part 102.

The locking projection 106 is generally formed in a ring shape, and its inner diameter D3 is formed smaller than the maximum outer diameter D1 of the nut 74 and simultaneously greater than the minimum outer diameter D4 of the nut 74 so as to be locked between the part having the maximum outer diameter and the part having the minimum outer diameter of the nut 74.

Here, the part having the maximum outer diameter of the nut 74 is an angled edge part 74A of the nut 74, the part having the minimum outer diameter of the nut 74 is a plane part 74B between the edge parts A, and the locking projection 106 is locked to the top surface between the edge part 74A and plane part 74B.

The nut 74 has an inclined surface 74C on its top surface, which is formed to be inclined downward as the plane part 74B goes to the edge part 74A so that the part having the minimum outer diameter D4 is thicker than the part having the maximum outer diameter D1.

The locking projection 106 is formed to have a thickness smaller than height difference between the plane part 74B and edge part 74A.

The groove 108 is formed to have a width wider than a part of the edge part 74A of the nut 74 so that the edge part 74A of the nut 74 may pass through the locking projection 106.

In a case where the nut 74 is a hexagonal nut, the inner diameter D3 of the locking projection 106 is smaller than the outer diameter D1 of the edge part 74A of the nut 74 and greater than the outer diameter D4 of the plane part 74B of the nut 74, and six grooves 108 are formed at the interval of 60° on the locking projection 106 so that the edge part 74A of the nut 74 is not locked.

More detailed assembling and installing procedure for the automatic height adjustment leg of the laundry handling apparatus according to the present invention configured as above will be described below.

First, the frictional member 82 is mounted in the mounting groove 78A of the piston 78, and then the piston 78 is inserted into the cylinder body 72 through the opened top surface of the cylinder body 72.

And, the frictional member 80 is inserted into the cylinder body 72 through the opened top surface of the cylinder body 72 so that the lower side insertion part 78B of the piston 78 may be inserted into the bottom end of the frictional member 80.

If the cylinder cap 76 is connected to the top end of the cylinder body 72 with the piston 78 and frictional member 80 inserted inside the cylinder body 72, the opened top surface of the cylinder body 72 is hermetically sealed by the cylinder cap 76.

At this time, the upper side insertion part 112A formed on the bottom surface inside the cylinder cap 76 is inserted into the top end of the elastic member 80, the elastic member 80 is stably installed by the upper side insertion part 112A and lower side insertion part 78B, and the piston 78 is elastically supported by the elastic member 80.

Meanwhile, when the cylinder cap 76 is rotated and connected to the upper side of the cylinder body 72, the first protrusion 122 formed on the bottom end of the connection part 110 of the cylinder cap 76 is also rotated and slid down together with the cylinder cap 76, and if the connection of the cylinder cap 76 and cylinder body 72 is complete, the first protrusion 122 is locked and fixed to the second protrusion 124 formed on the outer peripheral surface of the top end of the top end of the cylinder body 72.

If the first protrusion 122 is locked and fixed to the second protrusion 124, a plurality of protrusions 126 protruded downward on the first protrusion 122 are simultaneously locked with a plurality of protrusions 128 protruded upward on the second protrusion 124, and the cylinder cap 76 is not released voluntarily from vibration and impact.

In addition, since the first protrusion 122 is locked to the second protrusion 124 and thus can not be slid down any more, the location of connection of the cylinder cap 76 is determined by the first protrusion 122 and the second protrusion 124 and thereby over-connection of the cylinder cap 76 may be prevented.

The penetrating part 86 of the cylinder body 72 is penetrated and inserted into the penetrating hole 61a of the base bracket 61, and the cylinder body 72 is fixed to the base bracket 61 as the nut 74 is connected to the penetrating part 86.

Then, the releasing restriction device 100 is placed at the approximate lower side of the nut 74, and the direction of assembling the releasing restriction device 100 is adjusted so that the groove 108 may be located at the lower side of the edge part 74A of the nut 74.

Next, if the releasing restriction device 100 is slid up toward the nut 74, the edge part 74A of the nut 74 passes through the groove 108 and the releasing restriction device 100 is arranged so that the covering part 102 surrounds the outside of the nut 74.

Then, if the releasing restriction device 100 is rotated at a predetermined angle in the circumference direction so that the locking projection 106 may be placed on the top surface of the edge part 74A of the nut 74, the locking projection 106 of the releasing restriction device 100 is locked downward to the top surface of the edge part 74A of the nut 74, the releasing restriction device 100 is arranged around the nut 74 in the shape of surrounding the outside of the nut 74, and thus free releasing of the nut 74 can be prevented by the releasing restriction device 100.

If the bolt part 84A of the leg 84 is inserted into the penetrating part 86 of the cylinder body 72 and then connected to the connection groove of the piston 78, the leg 84 is arranged so that its upper side is fixed to the piston 78 and passes through the penetrating part 86, and its lower side is protruded outside.

When the bolt part 84A of the leg 84 is connected to the connection groove of the piston 78, the piston 78 is closely attached to the lower side of the cylinder body 72 by the elastic member 80, the first locking protrusion 92 formed on the bottom surface of the piston 78 is locked to the second locking protrusion 94 formed on the bottom surface inside the cylinder body 72, and the leg 84 is readily connected to the piston 78 without any idling.

Figure 9:
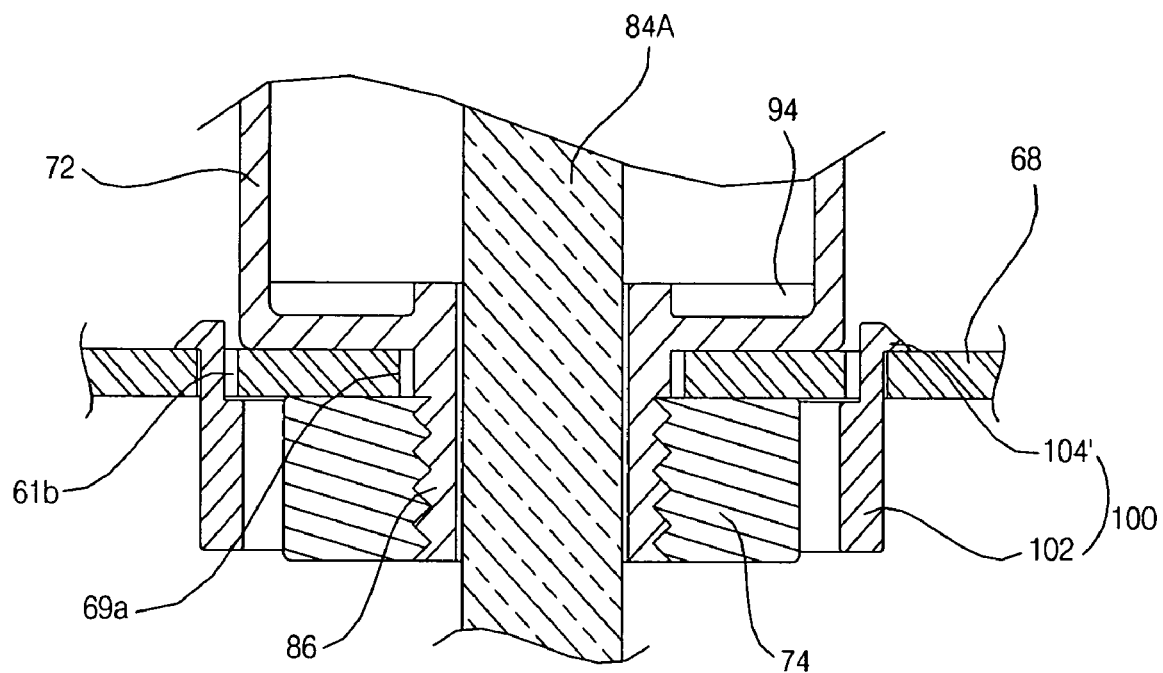
FIG. 9 is an enlarged sectional view of illustrating a main part of a second embodiment of an automatic height adjustment leg of a laundry handling apparatus according to the present invention.
Figure 10:
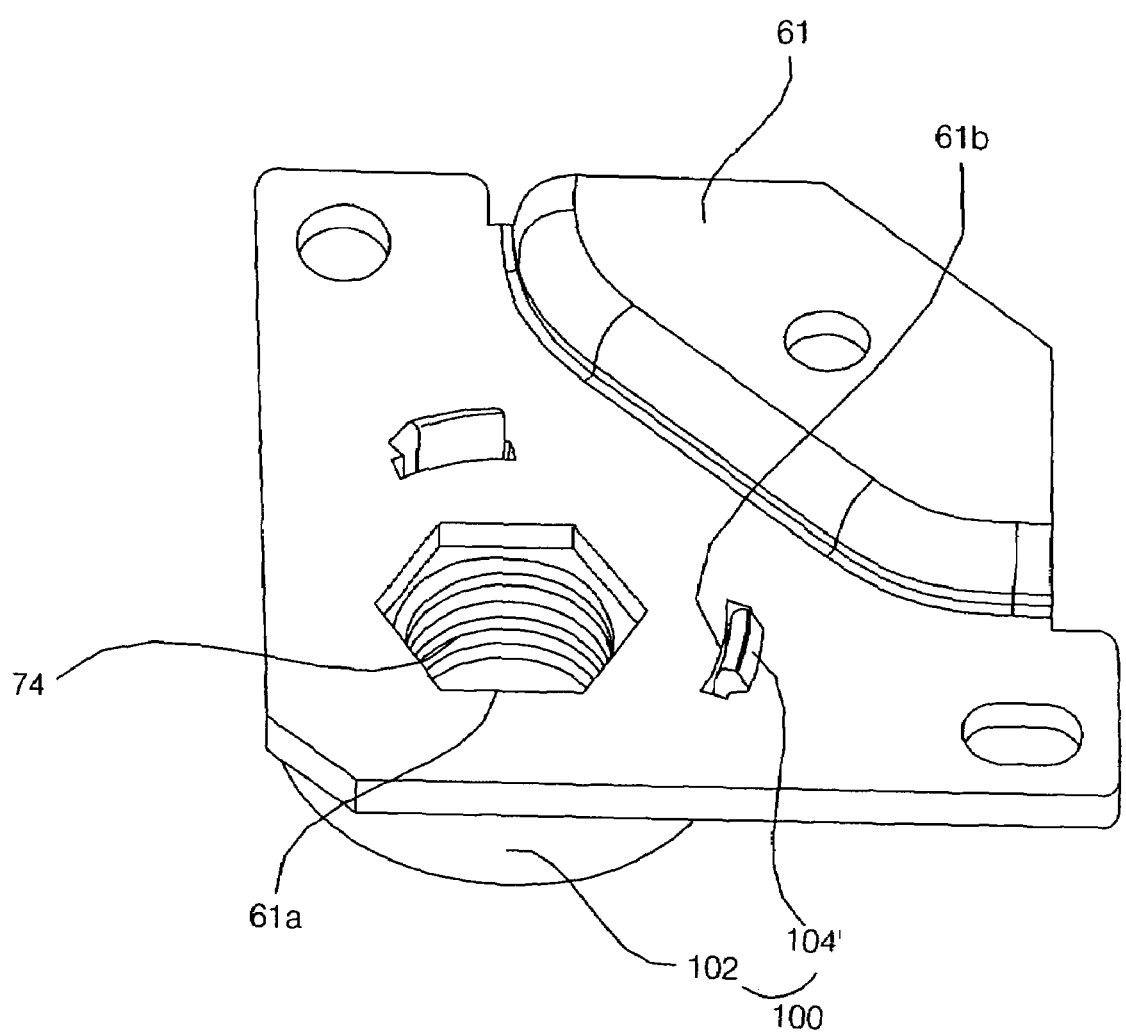
FIG. 10 is an enlarged prospective view of illustrating a releasing restriction device shown in FIG. 9.
Figure 11:
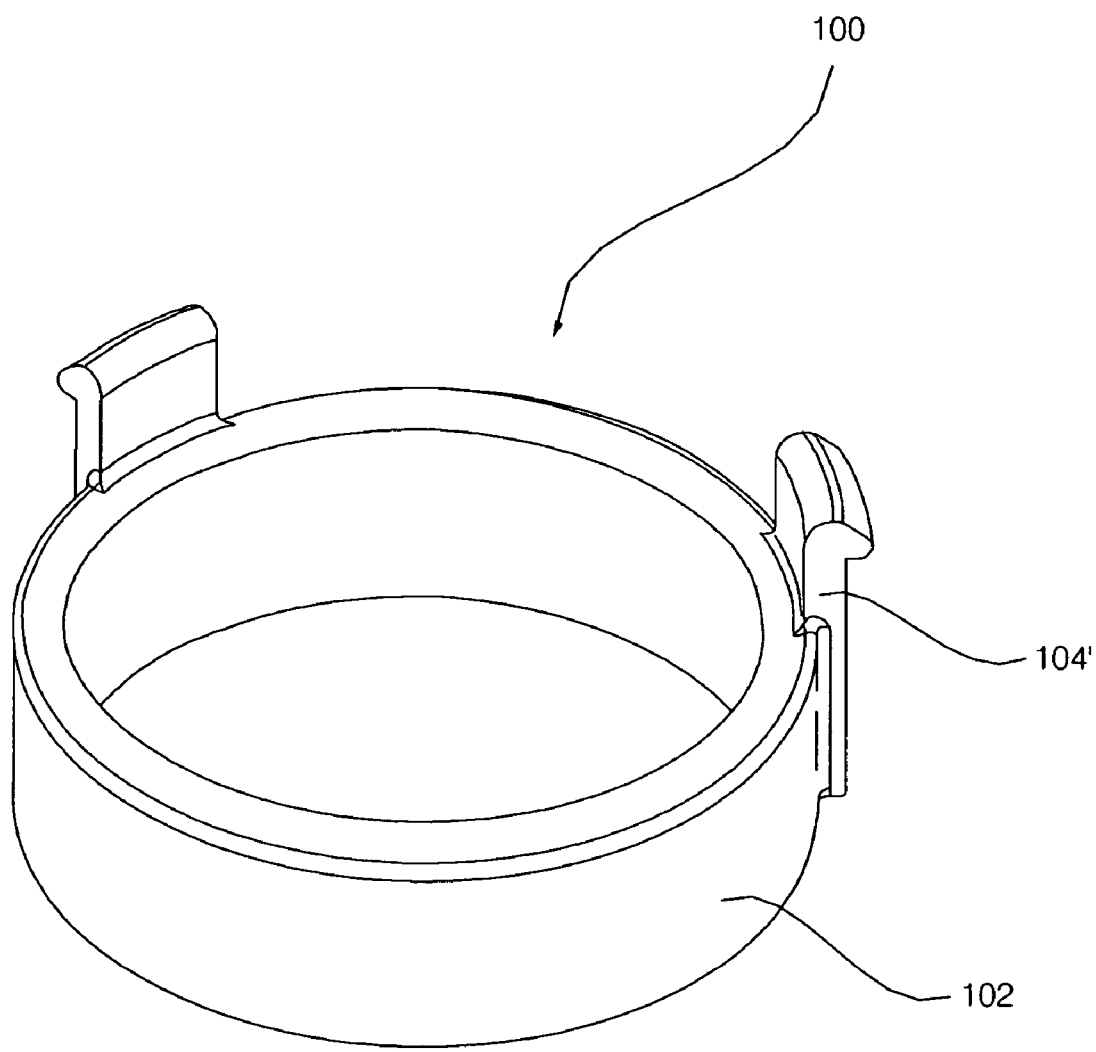
FIG. 11 is an enlarged prospective view of illustrating a state where a releasing restriction device shown in FIG. 9 is installed on a base bracket.

FIG. 9 is an enlarged sectional view of illustrating a main part of a second embodiment of an automatic height adjustment leg of a laundry handling apparatus according to the present invention, FIG. 10 is an enlarged prospective view of illustrating a releasing restriction device shown in FIG. 9, and FIG. 11 is an enlarged prospective view of illustrating a state where a releasing restriction device shown in FIG. 9 is installed on a base bracket.

The automatic height adjustment leg of the laundry handling apparatus according to this embodiment, as shown in FIGS. 9 through 11, includes a covering part 102 formed so that the releasing restriction device 100 surrounds the outer peripheral surface of the nut 74 connected to the penetrating part 86 of the piston body 72, and a hooking part 104' protruded upward from the covering part 102 and hooked onto a hooking hole 61b formed on the base, particularly the base bracket 61.

Here, the covering part 102 has the similar construction to the covering part 102 of the releasing restriction device 100 according to the first embodiment of the present invention, and its detailed description will be omitted.

The hooking part 104' is inserted into the hooking hole 61, and locked and fixed downward to the top surface of the base bracket 61 so that the covering part 102 arranged on the outside of the outer peripheral surface of the nut 74 is not slid down.

The hooking part 104' is plurally formed to be spaced in the circumference direction of the covering part 102, and the hooking hole 61b is plurally formed on the base bracket 61 to correspond to the hooking part 104'.

In the releasing restriction device 100, the hooking part 104' is protruded upward on the outer peripheral surface of the covering part 102 so that the hooking part 104' does not interfere with the cylinder body 72 installed on the base bracket 61, and the covering part 102 is formed to have the outer diameter greater than that of the cylinder body 72.

If the outer diameter of the covering part 102 is greater than that of the cylinder body 72, the hooking part 104' protruded upward on the outer peripheral surface of the covering part 102 is placed outside the cylinder body 72 and thus does not interfere with the cylinder body 72.

In the automatic height adjustment leg of the laundry handling apparatus according to this embodiment, the releasing restriction device 100 is placed at the lower side of the nut 74, and the direction of assembling the releasing restriction device 100 is adjusted so that the hooking part 104' is arranged at the location facing the hooking hole 61b of the base bracket 61.

If the releasing restriction device 100 is slid up toward the nut 74, the nut 74 is placed inside the covering part 102 of the releasing restriction device 100, and the hooking part 104' of the releasing restriction device 100 is inserted into the hooking hole 106.

If the releasing restriction device 100 is slid up until the nut 74 is placed inside the covering part 102 of the releasing restriction device 100, the hooking part 104' is inserted and penetrated into the hooking hole 106 and then locked downward to the top surface of the base bracket 61, and the releasing restriction device 100 is fixed to the base bracket 61 by the hooking part 104'.

Figure 12:
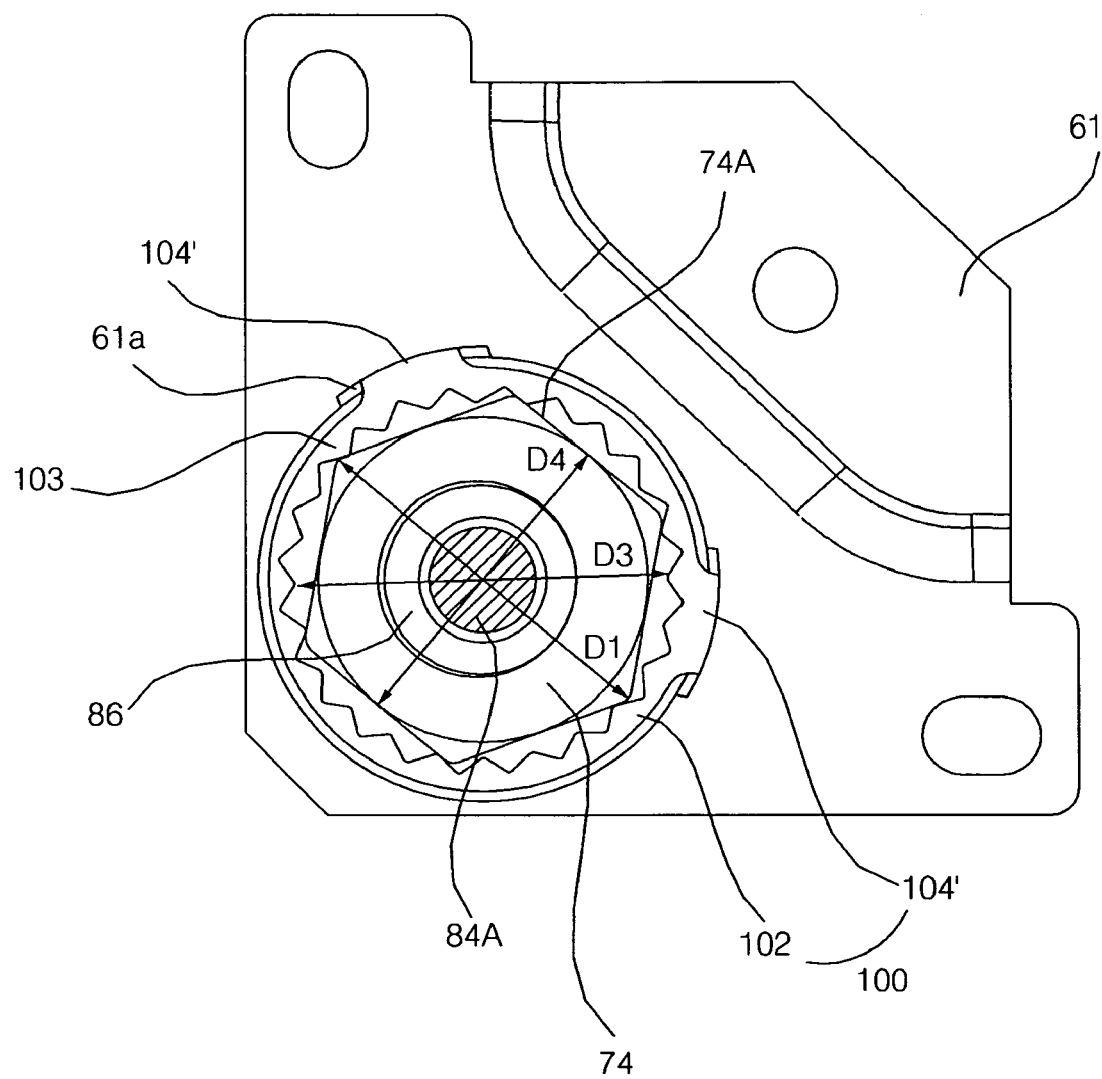
FIG. 12 is a bottom surface view of illustrating a third embodiment of an automatic height adjustment leg of a laundry handling apparatus according to the present invention.
Figure 13:
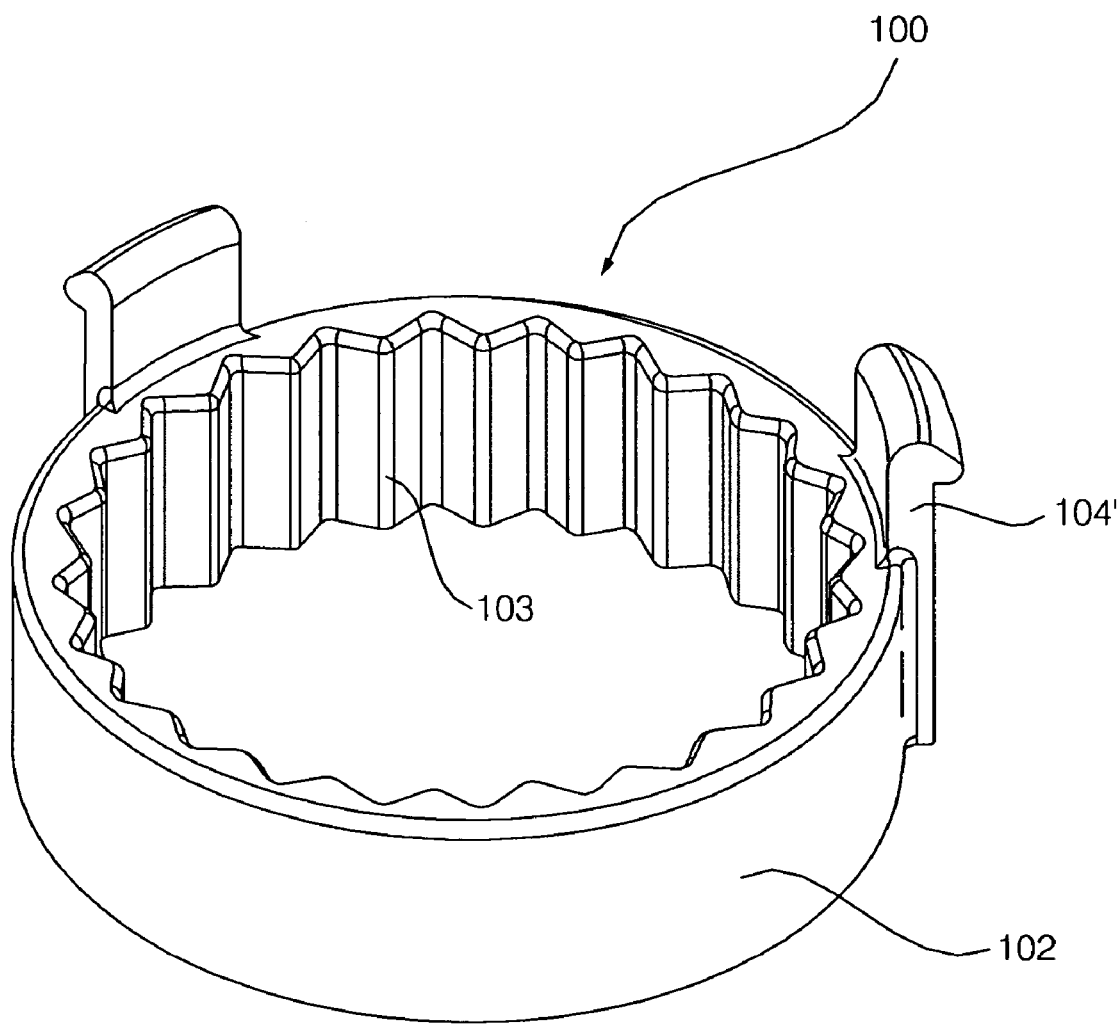
FIG. 13 is an enlarged prospective view of illustrating a releasing restriction device shown in FIG. 12.

FIG. 12 is a bottom surface view of illustrating a third embodiment of an automatic height adjustment leg of a laundry handling apparatus according to the present invention, and FIG. 13 is an enlarged prospective view of illustrating a releasing restriction device shown in FIG. 12.

In the automatic height adjustment leg of the laundry handling apparatus according to this embodiment, as shown in FIGS. 12 and 13, a prominent and depressed portion 103 is formed on the inner peripheral surface of the covering part 102 of the releasing restriction device 100 so that the edge part 74A of the nut 74 may be inserted in the upper and lower direction and locked in the circumference direction.

The prominent and depressed portion 103 is a protrusion protruded inward from the inner peripheral surface of the covering part 102, and this is long provided in the upper and lower direction on the inner peripheral surface of the covering part 132 so that the edge part 74A of the nut 74 may be inserted in the upper and lower direction and provided in plurality along the inner peripheral surface of the covering part 132 so that the edge part 74A of the nut 74 may be locked in the circumference direction.

The prominent and depressed portion 103 is projected at an appropriate height from the inner peripheral surface of the covering part 102, so that it may be locked to the part having the maximum outer diameter of the nut 74 but may not be locked the part having the minimum outer diameter of the nut 74.

Here, since the part having the maximum outer diameter of the nut 74 is the edge part 74A of the nut 74 and the part having the minimum outer diameter of the nut 74 is the plane part 74B located between two edge parts 74A, the distance D3 between two prominent and depressed portions 103 facing each other in the inner peripheral surface of the covering part 102 is greater than the minimum outer diameter D4 of the nut 74 and smaller than the maximum outer diameter D1 of the nut 74.

Since the edge part 74A of the nut 74 is inserted between the projecting parts of the prominent and depressed portion 103 and locked by the projecting parts of the prominent and depressed portion 103 in the circumference direction, the rotation of the nut 7 is restricted by the releasing restriction device 100 and thus free releasing of the nut 74 due to vibration and impact of the laundry handling apparatus 50 may be prevented.

Meanwhile, the hooking hole 61b in the base bracket 61 is formed to have some free space so that the hooking part 104' may be moved with slight room when the edge part 74A of the nut 74 is inserted.

That is, since the location of the edge part 74A of the nut 74 is not always constant when the nut 74 is connected, the location of the covering part 102 surrounding the outer peripheral side of the nut 74 is also varied at a predetermined angle in the circumference direction by the edge part 74A of the nut 74 and the location of the hooking part 104' is also varied at a predetermined angle together with the covering part 102.

Therefore, the hooking hole 61b is formed longer than the hooking part 104 so that the hooking part 104' may be fixed to the base bracket 61 without respect to its location variation.

Figure 14:
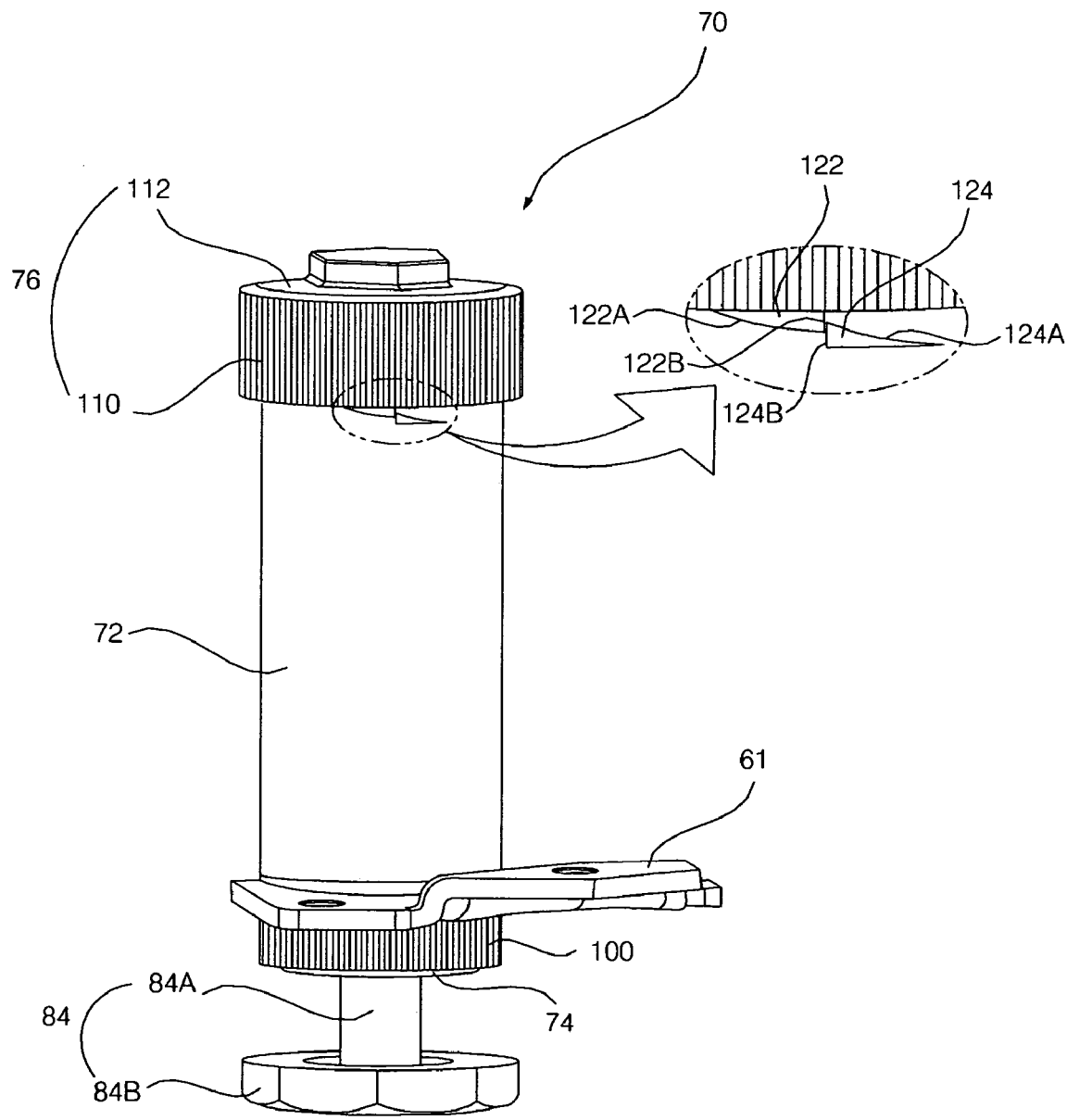
FIG. 14 is a prospective view of illustrating a fourth embodiment of an automatic height adjustment leg of a laundry handling apparatus according to the present invention.
Figure 15:
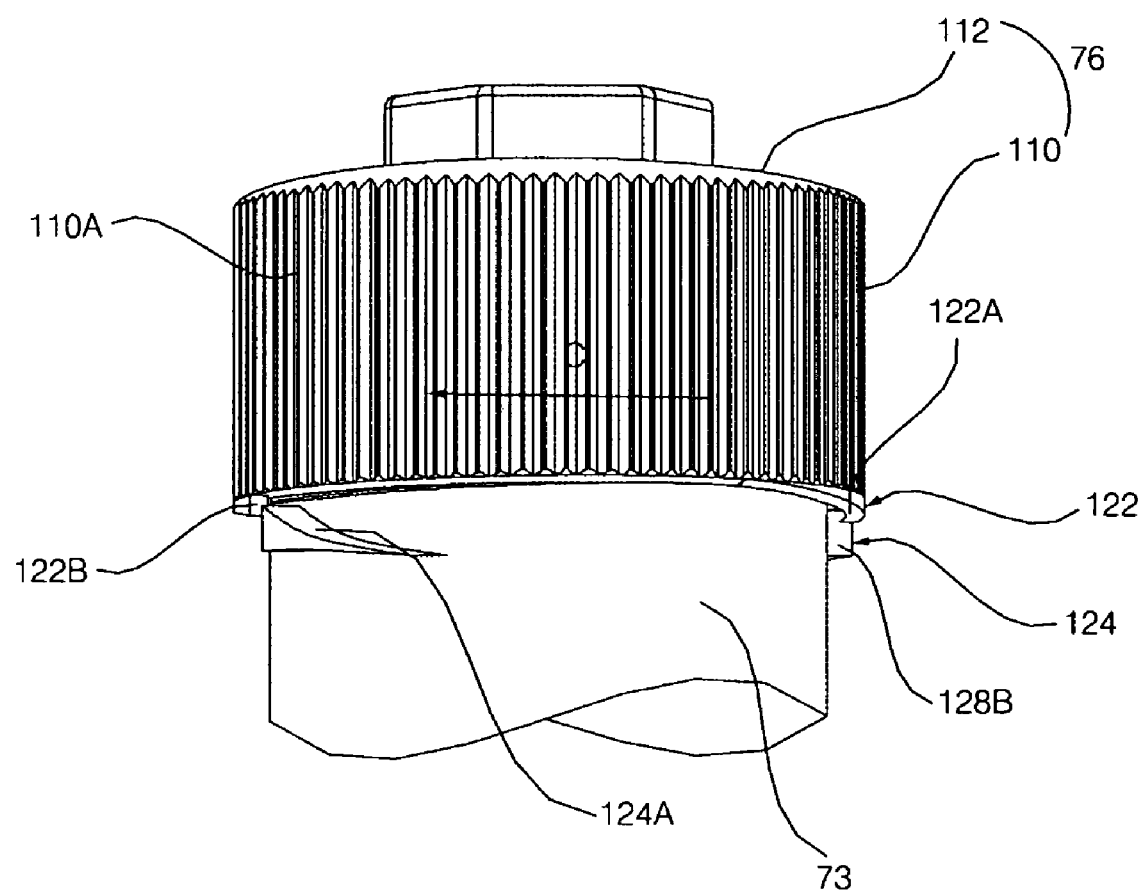
FIG. 15 is an exploded prospective view of illustrating a cylinder body and a cylinder cap shown in FIG. 14.

FIG. 14 is a prospective view of illustrating a first embodiment of an automatic height adjustment leg of a laundry handling apparatus according to the present invention, and FIG. 15 is an exploded prospective view of illustrating a cylinder body and a cylinder cap shown in FIG. 14.

In the automatic height adjustment leg of the laundry handling apparatus according to this embodiment, as shown in FIGS. 14 and 15, a first protrusion 122 having an inclined surface 122A formed in the connection direction is protruded on the cylinder cap 76, and a second protrusion 124 having an inclined surface 124A opposite to the inclined surface 122A of the first protrusion 122 is formed on the cylinder body 72 and locked and fixed to the first protrusion 122.

Here, the first protrusion 122 is protruded downward from the bottom end of the connection part 110 of the cylinder cap 76; this is formed on the lower side so that the inclined surface 122A is inclined upward in the connection direction of the cylinder cap 76.

And, the second protrusion 124 is protruded outward from the outer peripheral surface of the upper side of the cylinder body 72; this is formed on the upper side so that the inclined surface 124A is inclined upward in the connection direction of the cylinder cap 76.

The first protrusion 122 and second protrusion 124 are a protrusion which is protrudingly formed with a right-angled triangular structure on each of the bottom end of the connection part 110 of the cylinder cap 76 and the outer peripheral surface of the upper side of the cylinder body 72.

The inclined surface 122A is formed on the first protrusion 122 in the side of connection direction of the cylinder cap 76, and a vertical surface 122B is formed on the first protrusion 122 in the side of releasing direction of the cylinder cap 76.

A vertical surface 124B is formed on the second protrusion 124 in the side of releasing direction of the cylinder cap 76, and the inclined surface 124A is formed on the second protrusion 124 in the side of releasing direction of the cylinder cap 76.

Accordingly, in the time when the connection of the cylinder cap 76 is complete, the inclined surface 122A of the first protrusion 122 is slidingly moved while contacting the inclined surface 124A of the second protrusion 124, and if the first protrusion 122 goes over the second protrusion 124, then the vertical surface 122B of the first protrusion 122 is locked to the vertical surface 124B of the second protrusion 124.

Free releasing of the cylinder cap 76 is prevented by the locking force of the first protrusion 122 and second protrusion 124, and over-connection of the cylinder cap 76 is also prevented since the lower end of the cylinder cap 76 is locked to the upper end of the second protrusion 124.

In addition, the first protrusion 122 and second protrusion 124 are plurally formed in the location of corresponding to each other on the cylinder cap 76 and cylinder body 72 so as to be spaced at a predetermined distance in the circumference direction.

In the automatic height adjustment leg of the laundry handling apparatus according to this embodiment, as the cylinder cap 76 is rotated and connected to the upper side of the cylinder body 72, the first protrusion 122 formed on the bottom end of the connection part 110 of the cylinder cap 76 is also rotated and slid down together with the cylinder cap 76, and when the connection of the cylinder cap 76 and cylinder body 72 is complete, the first protrusion 122 is locked and fixed to the second protrusion 124 formed on the outer peripheral surface of the top end of the top end of the cylinder body 72.

That is, the inclined surface 122A of the first protrusion 122 contacts the inclined surface 124A of the second protrusion 124, and the inclined surface 122A of the first protrusion 122 is slidingly moved along the inclined surface 124A of the second protrusion 124.

If the first protrusion 122 and second protrusion 124 are elastically deformed and the inclined surface 122A of the first protrusion 122 goes over the inclined surface 124A of the second protrusion 124, then the elastic deformation of the first protrusion 122 and second protrusion 124 is restored and the vertical surface 122B of the first protrusion 122 is locked and fixed to the vertical surface 124B of the second protrusion 124.

Accordingly, free releasing of the cylinder cap 76 due to vibration and impact of the drum type washing machine 50 may be prevented by the locking force of the first protrusion 122 and second protrusion 124.

In addition, since the cylinder cap 76 is locked to the second protrusion 124 and thus can not be slid down any more, the location of connection of the cylinder cap 76 is determined by the second protrusion 124 and thereby over-connection of the cylinder cap 76 may be prevented.

Although the automatic height adjustment leg of the laundry handling apparatus according to the present invention has been described with reference to the exemplary drawings, the invention is not limited to the embodiments and drawings set forth herein, rather it is limited only to the accompanying claims and many alternatives, modifications, and variations will be apparent to those skilled in the art.

In addition, the elastic member of the automatic height adjustment leg may employ various elastic bodies other than coil spring, and the frictional member may be formed of a rubber material.

In the automatic height adjustment leg of the laundry handling apparatus according to the present invention configured as above, since the piston connected to the leg is arranged to be elastically moved in the cylinder, there is provided an advantage that the horizontality of the laundry handling apparatus is automatically adjusted as the piston and leg moves on, and vibration is absorbed or reduced by the elastic member.

In the automatic height adjustment leg of the laundry handling apparatus according to the present invention, in addition, since the first protrusion of the cylinder cap is locked and fixed to the second protrusion of the cylinder body, there is provided another advantage that free releasing of the cylinder cap may be prevented by the locking force of the first protrusion and second protrusion.

In the automatic height adjustment leg of the laundry handling apparatus according to the present invention, in addition, since the connection location of the cylinder cap is determined by the first protrusion and second protrusion when the connection work of the cylinder cap and cylinder body is performed, there is provided still another advantage that over-connection of the cylinder cap may be prevented.

In the automatic height adjustment leg of the laundry handling apparatus according to the present invention, in addition, since the first protrusion and second protrusion are formed to have a right-angled triangular structure in which the inclined surface and vertical surface corresponds to each other, there is provided yet still another advantage that the connection work of the cylinder cap may be readily executed by the inclined surface and the locking force of the first protrusion and second protrusion may be enhanced by the vertical surface.

In the automatic height adjustment leg of the laundry handling apparatus according to the present invention, in addition, since the releasing restriction device is arranged around the connection member of fixing the cylinder to the base and thereby the connection member is not freely adjusted and released by customer or unskilled repairer, there is provided yet still another advantage that damage to the automatic height adjustment leg or over-vibration of the laundry handling apparatus may be prevented.

In the automatic height adjustment leg of the laundry handling apparatus according to the present invention, in addition, since the releasing restriction device is hooked to the base, there is provided yet still another advantage that the releasing restriction device may be conveniently and swiftly assembled to the base and its detachment may be restricted.

What is claimed is:

1. An automatic height adjustment leg of a laundry handling apparatus, comprising:
   a cylinder mounted to a base of a laundry handling apparatus;
   a piston movably arranged inside the cylinder;
   an elastic member installed in the cylinder so as to elastically support the piston;

a leg penetrating the cylinder and fixed to the piston, wherein the cylinder comprises a cylinder body whose top surface is open; and a cylinder cap connected to the cylinder body to cover the top surface of the cylinder body and supporting the elastic member, wherein the cylinder body and cylinder cap are screw-connected, and wherein the cylinder cap comprises a first protusion, the cylinder body comprises a second protrusion, and the first protrusion can be locked and fixed to the second protrusion to thereby lock the cylinder cap to the cylinder body.

2. The automatic height adjustment leg of claim 1, wherein the first protrusion and the second protrusion are formed in a horizontal sawtooth shape in which a plurality of protrusions are arranged along a connection direction of the cylinder cap and cylinder body.

3. The automatic height adjustment leg of claim 1, wherein the first protrusion comprises a triangle having an inclined surface in a connection direction, and wherein the second protrusion comprises a triangle having an inclined surface that projects in a direction opposite to the inclined surface of the first protrusion.

4. An automatic height adjustment leg of a laundry handling apparatus, comprising:

a cylinder mounted to a base of a laundry handling apparatus, wherein a penetrating part of the cylinder passes through the base;

a piston movably arranged in the cylinder;

an elastic member installed in the cylinder so as to elastically support the piston;

a leg penetrating the cylinder and fixed to the piston; and a connection member connected to the penetrating part so as to mount the cylinder to the base; and a releasing restriction device restricting releasing of the connection member.

5. The automatic height adjustment leg of claim 4, wherein the releasing restriction device comprises:

a covering part surrounding an outside of the connection member, and a locking part extending from an upper side of the covering part and locked to a top surface of the connection member.

6. The automatic height adjustment leg of claim 5, wherein the locking part comprises a locking projection that protrudes inward from an upper part of the covering part sp as to be locked downward to a verge of a top surface of the connection member which is a nut.

7. The automatic height adjustment leg of claim 6, wherein the locking projection comprises a plurality of grooves that allow edges of the connection member to pass therethrough.

8. The automatic height adjustment leg of claim 7, wherein the locking projection is formed along the inner circumference of a top end of the covering part, and wherein the number of grooves correspond to the number of protruding outer edges of the connection member.

9. The automatic height adjustment leg of claim 5, wherein a prominent and depressed portion is formed on an outer peripheral surface of the covering part.

10. The automatic height adjustment leg of claim 4, wherein male screw threads are formed on an outer peripheral surface of the penetrating part, and wherein the connection member has female screw threads connected to the male screw threads.

11. The automatic height adjustment leg of claim 4, wherein the releasing restriction device comprises:

a covering part surrounding an outside of the connection member, and a hooking part that extends from the covering part and that is hooked to a hooking hole formed on the base.

12. The automatic height adjustment leg of claim 11, wherein a prominent and depressed portion is formed on an inner peripheral surface of the covering part.

13. An automatic height adjustment leg of a laundry handling apparatus, comprising:

a cylinder mounted to a base of a laundry handling apparatus, wherein the base comprises a base pan forming an appearance of a bottom surface of the laundry handling apparatus;

a piston movably arranged inside the cylinder;

an elastic member installed in the cylinder so as to elastically support the piston;

a leg penetrating the cylinder and fixed to the piston; and a base bracket mounted to the base pan and mounting the cylinder.

14. An automatic height adjustment leg of a laundry handling apparatus comprising:

a cylinder body whose top surface is open, the cylinder body formed with a penetrating part passing through a base of the laundry handling apparatus on its lower part;

a connection member connected to the penetrating part so as to mount the cylinder body to the base;

a releasing restriction device restricting releasing of the connection member;

a cylinder cap covering a top surface of the cylinder body;

a piston movably arranged inside the cylinder body;

a elastic member supported by the cylinder cap so as to elastically support the piston;

a leg passing through the penetrating part of the cylinder body and fixed to the piston; and a frictional member mounted to the piston so as to frictionally contact the cylinder body.

* * * * *